US007596583B2

(12) United States Patent
Chang et al.

(10) Patent No.: US 7,596,583 B2
(45) Date of Patent: Sep. 29, 2009

(54) DYNAMIC LEARNING IN REDESIGNING A COMPOSITION OF WEB SERVICES

(75) Inventors: Belinda Ying-Chieh Chang, Cary, NC (US); Vijay Dheap, Chapel Hill, NC (US); Christopher James Hardee, Raleigh, NC (US); Heather Castelli Miller, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 11/692,984

(22) Filed: Mar. 29, 2007

(65) Prior Publication Data

US 2008/0244526 A1 Oct. 2, 2008

(51) Int. Cl.
*G06F 17/30* (2006.01)
(52) U.S. Cl. .................................... 707/104.1
(58) Field of Classification Search .............. 707/2, 707/102, 104.1; 705/26
See application file for complete search history.

(56) References Cited

U.S. PATENT DOCUMENTS

| 7,047,243 | B2 | 5/2006 | Cabrera et al. | |
|---|---|---|---|---|
| 2003/0195813 | A1* | 10/2003 | Pallister et al. | 705/26 |
| 2004/0176988 | A1 | 9/2004 | Boughannam | |
| 2004/0205493 | A1 | 10/2004 | Simpson et al. | |
| 2005/0080768 | A1 | 4/2005 | Zhang et al. | |
| 2005/0096960 | A1 | 5/2005 | Plutowski et al. | |
| 2005/0097224 | A1 | 5/2005 | Chen et al. | |
| 2005/0132381 | A1 | 6/2005 | Fiammante et al. | |
| 2005/0165656 | A1* | 7/2005 | Frederick et al. | 705/26 |
| 2005/0283528 | A1 | 12/2005 | Rosu et al. | |
| 2006/0004764 | A1 | 1/2006 | Kurhekar et al. | |
| 2006/0069995 | A1 | 3/2006 | Thompson et al. | |

FOREIGN PATENT DOCUMENTS

| CN | 1 936 849 A | 3/2007 |
|---|---|---|
| WO | 2007/033922 A2 | 3/2007 |

OTHER PUBLICATIONS

Papazoglou, M.P. and Georgakopoulos, D.; Service-Oriented Computing; Communications of the ACM; Oct. 2003; pp. 25-28; vol. 46, No. 10; ACM ; US.

(Continued)

*Primary Examiner*—Etienne P LeRoux
(74) *Attorney, Agent, or Firm*—Stevens & Showalter LLP

(57) ABSTRACT

Business processes are constructed and/or modified utilizing system knowledge including a folksonomy that stores information regarding a group of services usable by composition applications that collects system monitored services usage information and user inputs. In one aspect, candidate services are recommended and/or automatically updated/replaced, which can implement aspects of a business process from the group of services based upon information derived from the system knowledge. In another aspect, a composition design component interacts with a user to build and/or modify services based upon identified aspect of business processes to be implemented by services, wherein the component design component recommends candidate services that can implement the aspects of the business processes from the group of services based upon information derived from the system knowledge.

21 Claims, 6 Drawing Sheets

OTHER PUBLICATIONS

Paar, A. and Tichy, W.F.; Semantic Software Engineering Approaches for Automatic Service Lookup and Integration; Proceedings of the Autonomic Computing Workshop Fifth Annual International Workshop on Active Middleware Services; Jan. 1, 2003; 108-115, XP010644231; ISBN 978-0-7695-1983-8; IEEE; Piscataway, NJ USA.

Dheap, V.; Edra: Event-Driven Response Architecture for Service-Based Computing; Thesis, M.A.S.C. Thesis; Jan. 1, 2004; 85 pages; Waterloo, Ontario, CAX.

Maximilien, E.M. and Singh, M.; A Framework and Ontology for Dynamic Web Services Selection; IEEE Internet Computing; Sep. 1, 2004; pp. 84-93; Sep.*Oct. 2004; IEEE Computer Society; New York, NY USA.

Dheap, V. and Ward, P.; Event-Driven Response Architecture for Event-Based Computing; Proceedings of the 2005 Conference of the Centre for Advanced Studies on Collaborative Research; 2005; pp. 1-13.

Thakker, D.; Osman, T.; Al-Dabass, D.; Web Services Hybrid Dynamic Composition Models for Ubiquitous Computing Networks; 8th International Conference on Advanced Communication Technology (ICACT2006); Feb. 20-22, 2006; pp. 274-280: IEEE.

Pfadenhauer, K.; Dustdar, S.; Kittl, B.; Challenges and Solutions for Model Driven Web Service Composition; Proceedings of the 14th IEEE International Workshops on Enabling Technologies: Infrastructure for Collaborative Enterprise (WETICE'05); May 2005; 0-7695-2362; IEEE.

* cited by examiner

DYNAMIC LEARNING IN REDESIGNING A COMPOSITION OF WEB SERVICES

BACKGROUND OF THE INVENTION

The present invention relates to systems, computer-implemented methods and computer program products for providing dynamic learning of usage characteristics and/or user perceptions of computer system resources. The present invention further relates to systems, computer-implemented methods and computer program products for using dynamically learned information to design and/or modify composition applications built using services.

Many organizations are moving towards a service oriented architecture where the data and business logic of the organization are implemented using assemblies of web services. In general, web services are software components that are capable of being accessed via standard network protocols using a standardized messaging system. Software applications written in various programming languages and running on various platforms can select from and utilize available web services to exchange data based upon the desired function/business logic to be implemented.

Typically, a web services application programming interface (API) is used to define and implement an organization's business processes by specifying flows of information. The web services API may also be used to transform the specified flows of information into corresponding composition applications, which are constructed from a web services. However, business processes are likely to change over time. Additionally, web services themselves may change over time. Accordingly, composition applications may also require change, become outdated and/or obsolete over time.

For example, a designed-for use of a web service may become obsolete as a result of changes implemented to a corresponding business process. Alternatively, the intended use of a given web service may not be how that web service is actually used in practice, such as where a new use is implemented for an existing web service in response to changes in the corresponding business process. Accordingly, changes in a business process may require an organization to manually review and redesign the composition application and/or web service implementations that are affected by the changes in the business process. This is a time consuming process that is prone to human error.

An organization may utilize ontologies that define the equivalencies and the relationships among the web services utilized to implement its business processes. With a typical semantic ontology, metadata can be added to enhance the information about the relationships between the web services. However, even with the inclusion of metadata, the ontology represents the relationships in a rigid format. For example, new services may not be associated to the ontology. Alternatively, new services may be added to the ontology but relationships, i.e. equivalencies, with existing services may not be defined or may be ill-defined. Still further, new services may be associated with the ontology but relationships with existing services may be incompletely specified, e.g., due to the lack of a seamless automated process for maintaining an ontology. In such cases, the ontology does not provide a complete picture of the relationships between the web services that exist.

BRIEF SUMMARY OF THE INVENTION

According to an aspect of the present invention, a system for monitoring composition applications and services within a community of users comprises a data collection component for storing system knowledge comprising usage history and user input relative to activities within community of users, where the system knowledge comprises at least a folksonomy. The system further comprises at least one of a user client component that interacts with the data collection component to enable a corresponding user to contribute user-derived information to the folksonomy and a monitoring component that monitors activities associated with the community of users and interacts with the data collection component to contribute usage information to the system knowledge. Still further, the system comprises an optimizing component configured to learn about the use of services over time, and to enhance relationships between services within the community of users by automatically triggering changes within the system based, at least in part, on information obtained from the system knowledge including the folksonomy.

According to another aspect of the present invention, a method for monitoring composition applications and services within a community of users comprises providing a data collection component for storing system knowledge comprising usage history and user input relative to activities within community of users, where the system knowledge comprises at least a folksonomy. The method further comprises performing at least one of providing a user client component that interacts with the data collection component to enable a corresponding user to contribute user-derived information to the folksonomy and providing a monitoring component that monitors activities associated with the community of users and interacts with the data collection component to contribute usage information to the system knowledge. Still further, the method comprises providing an optimizing component configured to learn about the use of services over time, and to enhance relationships between services within the community of users by automatically triggering changes within the system based, at least in part, on information obtained from the system knowledge including the folksonomy.

According to yet another aspect of the present invention, a computer program product for monitoring composition applications and services within a community of users comprises a computer usable medium having computer usable program code embodied therewith, the computer usable program code comprising computer usable program code configured to implement a data collection component for storing system knowledge comprising usage history and user input relative to activities within community of users, where the system knowledge comprises at least a folksonomy. The computer program product further comprises at least one of computer usable program code configured to implement a user client component that interacts with the data collection component to enable a corresponding user to contribute user-derived information to the folksonomy and computer usable program code configured to implement a monitoring component that monitors activities associated with the community of users and interacts with the data collection component to contribute usage information to the system knowledge. Still further, the computer program product comprises computer usable program code configured to implement an optimizing component configured to learn about the use of services over time, and to enhance relationships between services within the community of users by automatically triggering changes within the system based, at least in part, on information obtained from the system knowledge including the folksonomy.

DETAILED DESCRIPTION OF THE INVENTION

Figure 1:
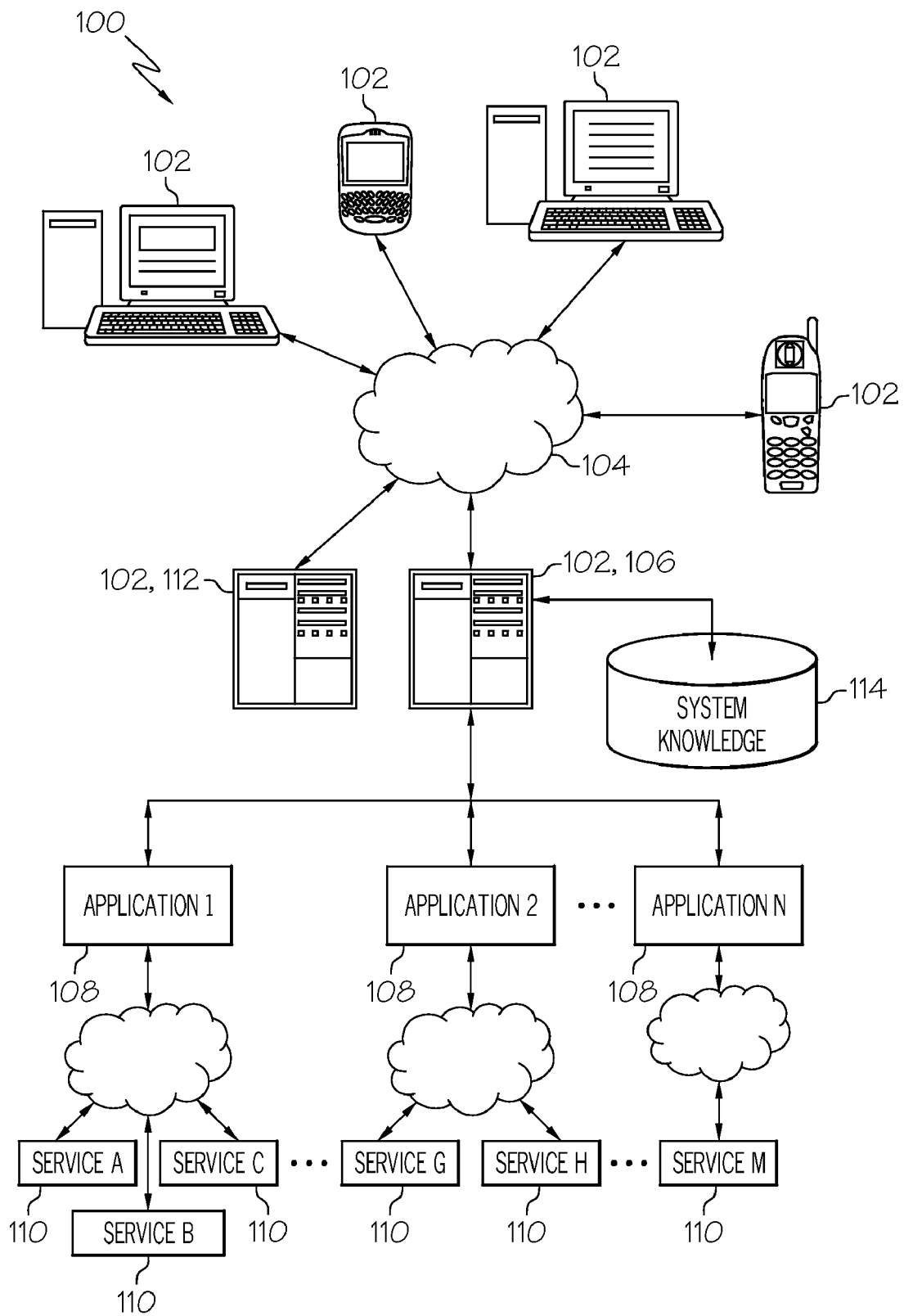
FIG. 1 is a schematic illustration of a computing environment.

The various aspects of the present invention may be embodied as systems, computer-implemented methods and computer program products. Also, various aspects of the present invention may take the form of an entirely hardware embodiment, an entirely software embodiment (including firmware, resident software, micro-code, etc.) or an embodiment combining software and hardware, wherein the embodiment or aspects thereof may be generally referred to as a "circuit," "module" or "system." Furthermore, the various aspects of the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store or transport the program for use by or in connection with an instruction execution system of a corresponding processing device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus or device.

More specific examples of the computer usable or computer readable medium comprise for example, an electrical connection having one or more wires, a swappable intermediate storage medium such as floppy drive, tape drive, external hard drive, a portable computer diskette, a hard disk, a random access memory (RAM), a read-only memory (ROM), an erasable programmable read-only memory (EPROM or Flash memory), a portable compact disc read-only memory (CD-ROM) or digital video disk (DVD), an optical fiber or storage device.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

Referring now to the drawings and particularly to FIG. 1, an exemplary system 100 is illustrated, which includes a plurality of processing devices 102 that communicate across a network 104. The processing devices 102 may comprise four example, servers, personal computers, notebook computers, transactional systems, appliance or pervasive computing devices such as personal data assistants (PDA), palm computers, cellular access processing devices, special purpose computing devices and/or other devices capable of interacting with the system 100, and may thus be implemented in hardware, software, or a combination of hardware and software.

The various processing devices 102 may be supported by networking components such as routers, hubs, firewalls, network interfaces, wired or wireless communications links and corresponding interconnections. Moreover, the network 104 may comprise one or more intranets, extranets, local area networks (LAN), wide area networks (WAN), wireless networks (WIFI), the Internet, including the World Wide Web, and/or other arrangements for enabling communication between the processing devices 102, either real time or otherwise, e.g., via time shifting, batch processing, etc.

In an illustrative example, a select one of the processing devices 102 may comprise a business server 106. The business server 106 may be part of a computer enterprise, which may consist of, or otherwise be in data communication with a community that utilizes loosely coupled and typically independent software services to support the requirements of business processes and software users, such as in a service oriented architecture (SOA). For purposes of illustration, the business server 106 is shown as hosting one or more composition applications 108 (also labeled Application 1-Application N). In general, however, processes including information flows can be implemented as corresponding composition applications 108 on any of the processing devices 102. Each composition application 108 is assembled using one or more services 110, which may be selected from a set of services labeled Service A-Service M so as to implement a flow of information defined by a corresponding business process.

Each service 110 may be able to implement at least one function, e.g., a process, computation or other defined task that may comprise an aspect utilized by one or more business processes. Thus, it is possible that a given composition application 108 may be capable of performing a defined aspect of its corresponding business process using any one of a number of services 110 or combinations of services 110. Moreover, the selection of the optimal and/or preferred services 110 may change over time. For example, a cost or other utilized service metric may change over time, a service may be revised so as to become more efficient, changes in a corresponding business process may cause a modification to a preference for a given composition application, etc.

For example, although Application 1 is illustrated as utilizing Service A, Service B and Service C to implement its corresponding business process, there may be multiple alternative candidate services 110 and/or candidate services combinations that may be utilized by Application 1. Moreover, there need not be a direct one-to-one between the subparts, e.g., the various steps, functions, roles etc., in a process corresponding to Application 1 and its corresponding services 110. As an example, a subpart of Application 1, e.g., a defined role may be performed by Service A, but may alternatively be implemented by the combination of Service D and Service E. Likewise, it may be possible to replace both of Service B and Service C with a single service 110, e.g., Service F. Moreover, Service A may implement, for example, subpart 1 of Application 1, whereas Service B may implement, for example, subparts 2 and 3 of Application 1, etc.

As yet a further example, it is possible that a first user may execute the business process implemented by Application 1 in a manner that utilizes Service A, but a second user may execute the business process implemented by Application 1 in a manner that utilizes a different service 110 or combination of services 110 in place of Service A. As such, at any given time, each service 110, such as in the set of services Service A-Service M, may be unused by the various composition applications 108. Alternatively, a service 110 may be used by one or more of the composition applications 108. Further, from time to time, new services 110 may be added and/or existing services 110 may be removed, such as to accommodate changes in business processes.

Still further, the services 110 may be originated from third parties, from resources within a corresponding enterprise or otherwise provided within a community of users. Thus, the various services 110 of a given composition 108 may reside on the same physical device, e.g., the business server 106, the services 110 may be distributed across one or more devices, e.g., on one or more business servers within a corresponding organizations computer enterprise, the services 110 may be otherwise distributed across the network 104, etc. The services 110 associated with each composition application 108, e.g., Service A, Service B and Service C of Application 1, may conduct transactions with the various composition applications 108, including Application 1 itself. The services 110 may also transact with other services 110, including services 110 associated with Application 1 and with other composition applications 108 and/or with other processes implemented on a suitable processing device 102 across the network 104 according to the particular function of each service 110.

Each composition application 108 may comprise, for example, a web-based application, an intermediate application that interacts with other applications or services within the business server 106, organization enterprise, or an application that otherwise interacts with one or more processing devices 102 across the network 104.

By way of illustration and not by way of limitation, a first composition application 108, e.g., Application 1, may comprise an on-line web-based store. Similarly, each of the services 110 may be implemented in web-based environment, and may thus also be referred to as web services. A customer using one of the processing devices 102 may wish to conduct a transaction by interacting with the on-line store to purchase an item. Under this arrangement, Service A may provide a search function to locate items available for sale at the on-line store, Service B may implement an electronic shopping cart and Service C may process payments when a customer checks out of the store with items in their shopping cart. As the customer interacts with the on-line store, the corresponding services 110 transact as part of the composition application 108 as their respective roles are required to service the customer interaction.

Assume that the customer has selected an item and is ready to check out the item from the shopping cart. Service C may process the customer's payment, e.g., which is received via a credit card. In order to process the payment, it may be necessary for Service C to communicate with a third party, such as a corresponding credit card company, to verify financial information and to receive payment for the item(s) purchased by the customer. Thus, Service C may communicate across the network 104, for example, to transact with a third party, such as server 112.

As noted above, it may be that several candidate services 110 available to Application 1 are capable of performing a desired role, e.g., implement a function, task or other required process. For example, there may be several candidate services 110 that can implement the role of the shopping cart, which is currently provided by Service B. These candidate shopping cart services may be different versions of a given shopping cart, they may be different shopping carts, which may be further originated from different sources, e.g., different service providers, including third party service providers, they may be independently programmed or otherwise available for use from any suitable sources.

An optimal or otherwise preferred service 110 in a particular composition application 108 may change over time. Also, a change in business process may require a corresponding change in an associated composition application 108. Accordingly, the composition applications 108 and their associated services 110 may be monitored, tracked or otherwise evaluated. For example, system knowledge 114 may be collected and suitably stored, such as in a database or other suitable storage format. The information in the system knowledge 114 may be utilized, for example, to build new composition applications 108, to modify existing composition applications 108, such as by replacing services 110, or to otherwise modify, update or change the implementations of one or more business processes, as will be described in greater detail herein.

Keeping with the above example, it may be that the entity whose business processes are implemented on the business server 106 purchases, rents, leases, licenses or otherwise contracts with a software provider to acquire the use of Application 1 and/or one or more of its services, which are currently illustrated as Service A, Service B, Service C. The software provider may be a software intermediate that assembles composition applications 108 by developing and/or acquiring rights to use each of the services 110, e.g., from third party service providers, from proprietary sources or from other resources. The composition applications 108 and/or one or more services 110 may also be internally developed by an entity associated with the computer environment, such as by one or more programmers within a corporate information technology department, or they may be provided by other sources.

By utilizing the collected system knowledge 114, the composition applications 108 and/or corresponding services 110 can be optimized, modified or otherwise altered to better facilitate operation thereof, and/or to facilitate improved integration within the corresponding system. As will be described in greater detail herein, the system knowledge may comprise a combination of usage history, such as monitored information that may be automatically detected and recorded by a component within the system, and user input, which may comprise categorizations and/or annotations that characterize the opinions, impressions, reactions and other inputs from users within the community. As such, usage history and user input can be utilized to enhance the relationships between services in an automated or manually driven fashion. Also, knowledge obtained by the system with regard to corresponding services can be built upon using information from the community.

As an example, going back to the above illustration, at some time, the system knowledge 114 may be evaluated. The usage history of those evaluations may reveal, for example, that Service B is less optimal for Application 1 than either Service I or the combination of Service J and Service K. However, users may prefer the interface of Service B over the interface provided by the combination of Service J and Service K. Moreover, user input may reveal that users like the interface of Service I just as much as the interface of Service B. Accordingly, an appropriate change to Service I may be implemented, either manually or automatically.

As yet another example, a process executed on Server 112 may be required to interact with Application 1, e.g., to transact a payment with Service C. Server 112 may be maintained by an independent party to the transaction between the above-customer and the business associated with Application 1 supported by server 106. Server 112 may thus be outside the control of the computer enterprise associated with the server 106. However, server 112 may be considered part of the community of users that interact across the network 104 with the composition applications 108, e.g., via their services 110. Accordingly, users (including human and computer implemented processes) may be able to contribute to the system knowledge 114 associated with the composition applications 108 and services 110, even if not directly a part of a corresponding business's computer enterprise. For example, a user interacting with Server 112 may provide user input such as annotations that characterize an experience with Service C. As such, a community of users, which may extend across one or more enterprises, may contribute to the system knowledge 114, as will be described in greater detail herein.

The above example is presented by way of illustration, and not by way of limitation, of a system including composition applications that are assembled from services. In practice, the composition application assemblies may be constructed from any number of services. Moreover, the composition applications and the corresponding services may implement any number of diverse processing tasks and may be provided from one or multiple sources.

Figure 2:
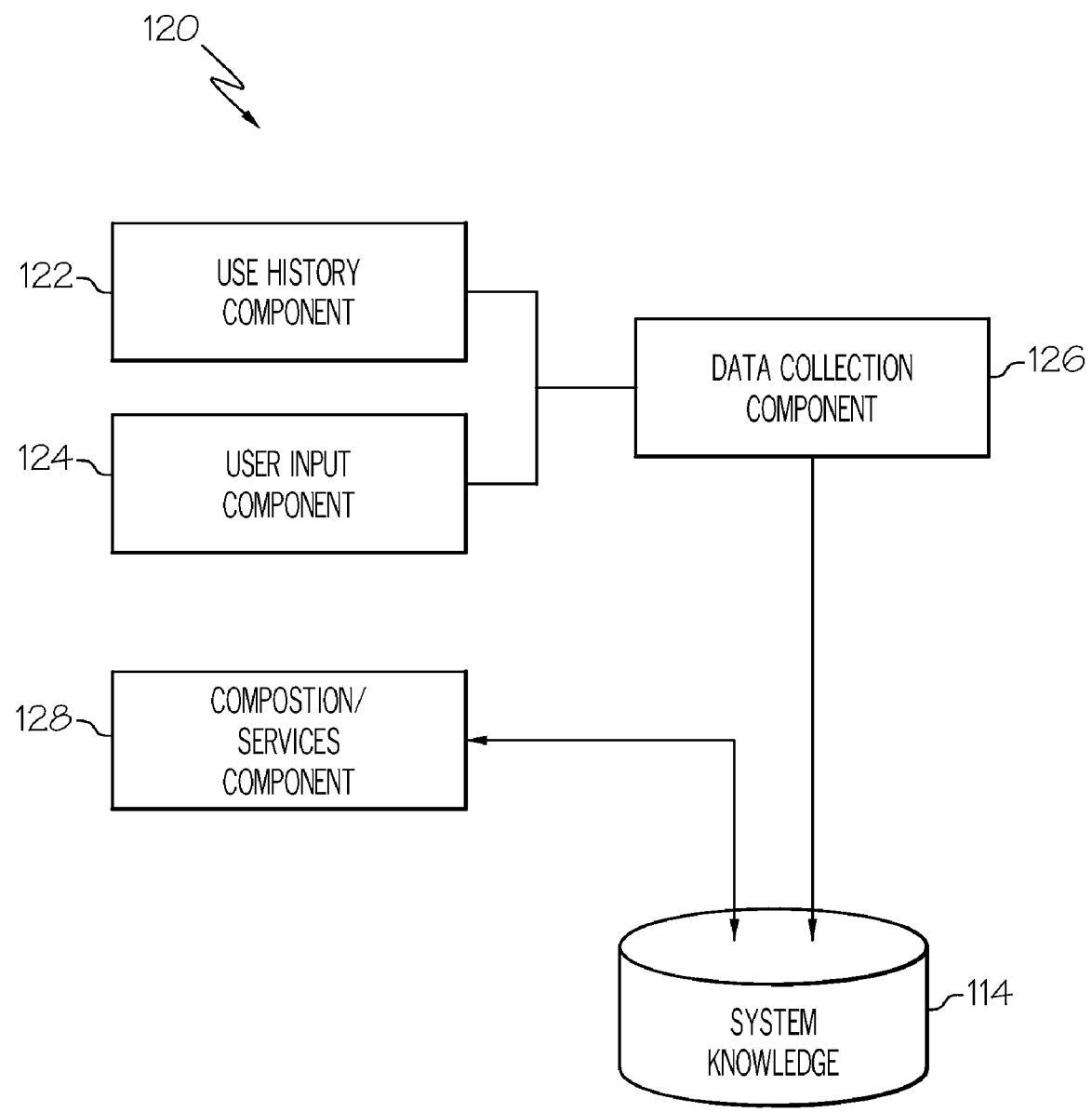
FIG. 2 is a block diagram for collecting use history and/or user input.

Referring to FIG. 2, according to an aspect of the present invention, a system 120 for collecting system knowledge 114 may comprise a usage history component 122, which tracks usage and/or other performance metrics. The usage history component 122 may be an automated process (or group of processes) that monitors systems including composition applications 108 and composition application subparts, which may comprise one or more services 110, such as within an enterprise or otherwise within a community of users. Additionally, user preferences may impact the selection of services 110. Accordingly, a user input component 124 may be provided. The user input component 124 may enable users within the community to contribute opinions, preferences, reactions, labels and other tags, categorizations, performance related information and other information to the system knowledge 114. The system knowledge 114 may thus represent the collective knowledge of how services 110 are used in business processes.

As an example, a data collection component 126 may be provided, such as within the business server 106, to manage the storing of use history information from the usage history component 122 as well as user input information from the user input component 124. Still further, a composition/services component 128 may utilize the system knowledge 114 to enhance the relationships between services 110 and corresponding composition applications 108 in an automatic fashion and/or in a manual fashion, such as by interacting with a user who is building or modifying a composition application 108 to recommend services 110 and/or to otherwise make the system knowledge 114 available to the user.

The system knowledge 114 may be used for example, to learn about the usage of composition applications 108 and/or services 110 over time, so that adjustments may be implemented within the system, as desired, e.g., to adjust the relationships between services based upon the learned knowledge. The system knowledge 114 may also be utilized, for example, in selecting appropriate services 110 when building new composition applications. The system knowledge 114 is shown as being stored by the business server 106 in FIG. 1, but may alternatively be stored in any suitable fashion, such as within an organization's enterprise or otherwise stored on a processing device 102 which can communicate with the business server 106 across the network 104. Further, the system knowledge may be stored by aggregating the system knowledge in a data store, database(s) or other suitable storage structure(s), or the system knowledge may be stored in a distributed manner. In one illustrative example, the system knowledge 114 may be arranged as metadata that is stored with the associated composition applications 108 and/or corresponding services 110. Other arrangements may alternatively be implemented to store the appropriate system knowledge 114.

Still further, different storage formats may be used for different types of system knowledge. For example, as will be described in greater detail herein, the system knowledge may comprise a folksonomy for storing categorizations and/or user annotations. Still further, performance metrics, usage information, cost of execution and other process related information may be stored as part of the system knowledge, but not necessarily as part of the folksonomy, using appropriate storage techniques.

Further, as will be described in greater detail herein, the strength of the relationships between activities within the system, e.g., between certain composition applications 108 and/or services 110 may be enhanced by the input from a community comprised of users, e.g., within an enterprise or otherwise across the network 104. Thus, for example, services 110 associated with a composition application 108 may be replaced or modified so as to realize better-defined relationships within a corresponding business process. The replacement and/or modification of services 110 can be achieved by following a policy-based mechanism, user rating or using any other suitable approach.

Figure 3:
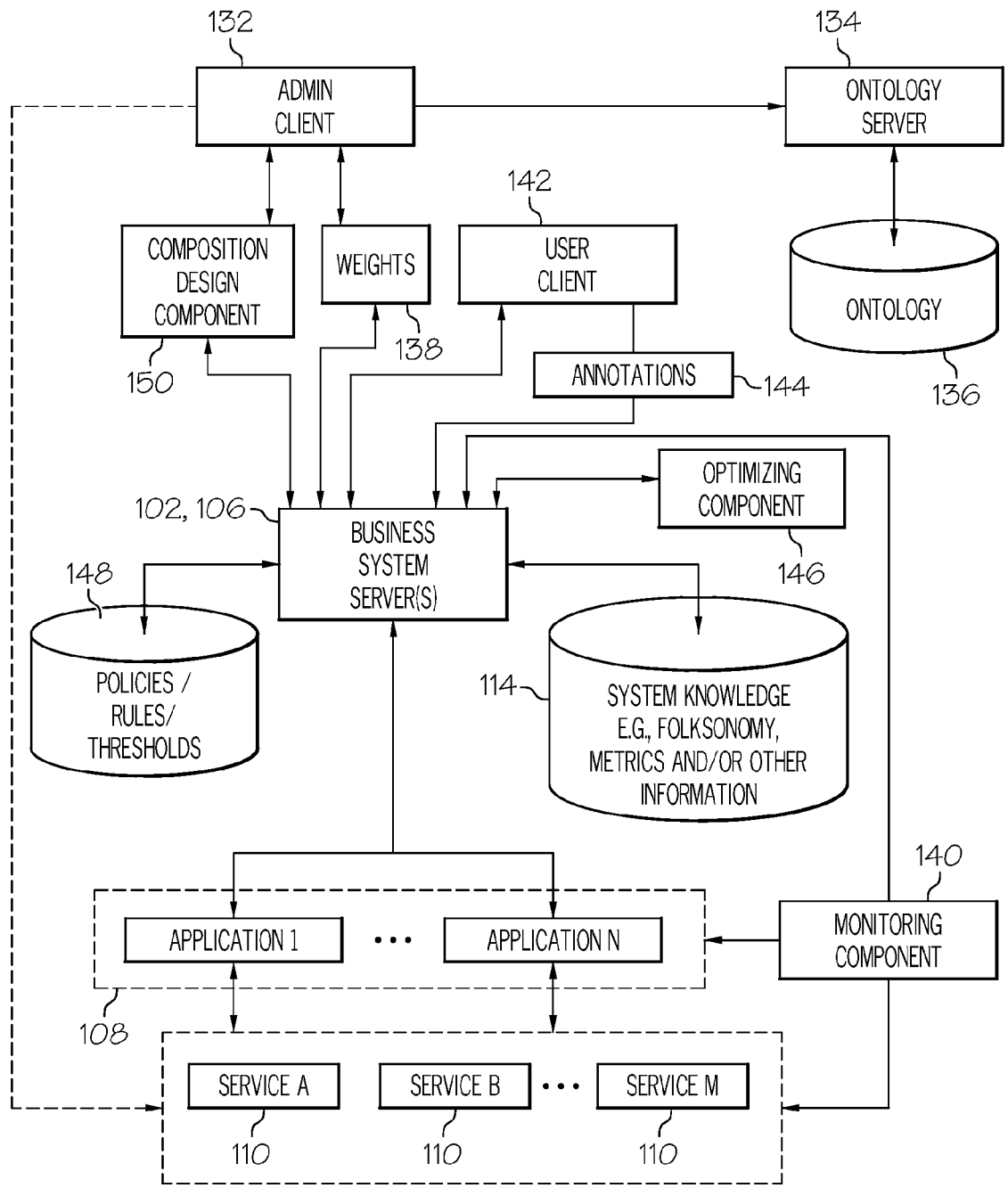
FIG. 3 is a block diagram of a system for collecting and using system knowledge corresponding to services of composition applications.

Referring to FIG. 3, in an illustrative implementation of an aspect of the present invention, an administrator or other person may utilize a suitable administration client component 132, e.g., an ontology client or other suitable interface to create, modify, manage or otherwise maintain on ontology, such as by interacting with an ontology server 134 and corresponding ontology data 136. The ontology 136 may, for example, define the equivalencies and relationships among an associated organization's web services.

The administrator may also utilize the administration client component 132 (or other interface) to assign, modify or otherwise update weights 138 that may be written, e.g., to the system knowledgebase 114 or to any other suitable storage location, via a suitable processing device 102, such as a business server 106. The weights may be utilized to express the relationships between the services 110. Initial weights can be created, for example, at the time that the ontology is created/updated or otherwise modified, or at any other suitable time. The ontology administrator or other person may further manually update or otherwise change previously created weights 138 at any appropriate time or an automated process of the system may update the weights from time to time. For example, weights representing how well services work together may updated to reflect the current usage patterns of corresponding services 110. Moreover, the weights relating to how well services work together may be inferred from the usage patterns recorded into the system knowledge 114.

According to an aspect of the present invention, the relationships between the services 110 may be modified, e.g., automatically and/or manually over time based upon the system knowledge 114. In this regard, a number of different factors may contribute to the accumulation of the system knowledge 114.

As noted above, the system knowledge 114 may be expanded, based upon usage information collected with regard to activities within the system, e.g., usage of composition applications 108 and corresponding service 110. For example, one or more instances of a monitoring component 140 may implement the use history component 122 (shown in FIG. 2). In this regard, the monitoring component 140 may monitor one or more composition applications and/or composition application subparts, including one or more services 110. The monitoring component(s) further contribute usage information to the system knowledge 114. Thus, the system knowledge 114 may comprise, for example, knowledge about which services 110 that users select and how those selected services 110 are used to interact with other processes, including composition applications 108 and other services 110. Essentially any event, computation, statistic, measurement, condition or other characteristic that is recordable by the monitoring component 140 can become part of, or may otherwise be converted to information stored in the system knowledge 114. Moreover, collected knowledge may not be limited to the services themselves. Rather, use histories may be influenced by overall uses of composition applications, data channels of communication, time, date, frequency of access, duration of interaction, processing resources/cost, failure rates, and other activities (or lack of activities).

Further, users interacting with the composition applications 108 may utilize a user client 142 to contribute to the system knowledge 114. For example, one or more instances of the user client 142 may implement the user input component 124 (shown in FIG. 2), such as by providing an interface that allows users to submit annotations 144 to the system knowledge 114. The user client 142 or other suitable interface to the system knowledge 114 may thus serve as and/or otherwise enable a tagging system capable of processing labels, tags, classifications, categorizations, suggestions, comments, perceptions including opinions and observations, and other metadata associated with composition applications 108 and/or services 110, which are provided by a community of users.

Moreover, an optimizing component 146 may be provided to trigger changes to activities within the system based, at least in part, on information obtained from the system knowledge including the folksonomy. For example, the optimizing component 146 may make recommendations about service selection based upon information stored in the system knowledge 114, including for example, the weights 138, usage history information, user input information, etc., which may be manually or automatically acted upon. The optimizing component 146 may also learn about the relationships between composition applications 108, services 110 and the overall system over time based, at least in part, by the system knowledge. The optimizing component 146 may be further used, for example, to keep older composition applications 108 up to date, by periodically evaluating whether the services 110 of an older composition application 108 are still operating within satisfactory performance measures. For example, if a service 110 exceeds a predetermined threshold level measure, or if policy or rule conditions are satisfied (or not satisfied), then a service 110 replacement may be recommended, automatically implemented, etc.

For example, rules, policies, threshold values and/or other criteria and other relevant evaluation information may be stored, such as in the data area 148. Such information may be provided, for example, via the administration client component 132, the composition design component 150, etc. Under this arrangement, the optimizing component 146 may interact with the system knowledge 114 as well as one or more of the stored rules, policies, threshold values and/or other criteria and other relevant evaluation information when performing evaluations and when triggering changes to activities within the system, such as by automatically taking action or by recommending changes.

Still further, the system knowledge 114 may be utilized by a user such as an administrator, developer, etc., when building or modifying composition applications 108 and/or services 110. For example, one or more instances of a composition design component 150 may implement the composition/services component 128 (shown in FIG. 2), such as may be utilized to search, review, categorize, or otherwise evaluate the system knowledge 114.

For example, when a user builds and/or modifies a business process, e.g., using the composition design component 150, that user may select a flow of services 110 to represent the process. While selecting the services, the system can suggest modifications to the user's process based upon the system's knowledge of the available services 110. There may be several services 110 that are capable of implementing a desired function as part of a business process. The composition design component 150 may be used to rank the available services 110, such as by displaying a ranked list, etc., so that a user can make an informed selection of the services 110 that are utilized to build or modify the composition application 108 associated with the business process under consideration. Thus, administrators may calibrate the metrics involved in assisting or ranking a service 110 and its viability to operate within composition applications 108, such as by adjusting the data stored in the data area 148.

The system can provide a ranked of possible matches of candidate services 110 to corresponding business functions. For example, the composition design component 150 may interact with the system knowledge 114, the monitoring component 140, optimizing component 146 and/or other processes to evaluate services 110 and/or the current knowledge of the relationships between services, to derive the ranked list. Moreover, depending upon the implementation, features and/or aspects of the optimizing component 146 may be implemented by the composition design component. For example, policy-based mechanisms (additional constraints for determining optimal choices) may be implemented for creating the list of recommendations, such as by interacting with policies, rules, thresholds and other evaluation data stored in the data resource 148. Still further, user ratings and other factors may be considered when constructing the list.

During the process of building or modifying a composition application 108 and/or service 110, the user can examine the list, associated usage histories and user input associated with the matched services 110, and other relevant data that support the recommendations, as well as other information within the system knowledge 114. Still further, other system knowledge 114, e.g., information pertaining to unranked services 110 may also be provided.

The system may be able to find numerous matches to satisfy a service request. As such, the matching services may be sorted, such as based upon a best match using the usage metadata added to the services. Service usage information may be kept up to date by including an updating metadata in the service itself or in a separately stored location, such as in a suitable database.

Further, when a new service is added, default values/rankings can be assigned, e.g., using a policy-based mechanism or other suitable approach. Under this arrangement, new services may be added using the same or different weight values, e.g., based upon rules set by the users/system/groups/etc. Thus, as an example, in a first case, if a creator of a new service is a well-trusted person, then his new service may be initialized with a relatively high weight compared to a new service created by an unknown or untrustworthy source. Over time, the usage of the service gradually modifies the initial weight value. In another exemplary implementation, a user may need to initially associate a new service to a relative service. Once the initial relation is established, the system can infer the rest of the relations.

The usage data may also be monitored for automated selection of more optimal replacement services. Still further, the organization of the collected system knowledge, including usage history and user inputs, may enable the knowledge gained from a first user to be shared with a second user within the same or even across a different community of users. Accordingly, the knowledge of the community may be exploited to create the best workflows. In addition, users are able to consider suggestions from other users within the community to make decisions as to which services to select for their flow.

In an exemplary implementation, any portion of the associated system knowledge 114 may be made available to a user for inspection. For example, the user may be able to view, browse, search or otherwise have access to information for each ranked and listed service 110 as well as other services 110, including inspection of descriptors, tags including keywords, comments, URL links, and/or XML information, information that classifies, categorizes or otherwise indexes the associated service(s), such as classification-oriented identifier(s), categorization-oriented identifier(s), semantic web-based identifier(s), e.g., ontology identifiers and other associated data.

The system knowledge 114 may provide a framework to define domains in which to classify services. For example, an organization or group of organizations can start with a rough ontology. The system knowledge 114 may further, be organized into a folksonomy, which may facilitate a community driven refinement process for increasing the accuracy, classification and selection of services for dynamic composition. Thus, a mechanism is specified for formulating the classification ontology and how it evolves. Accordingly, the folksonomy may include collaboratively generated, open-ended labels that categorize or otherwise classify contributions to the system knowledge 114 using various proprietary or non-proprietary classification schemes that can be identified and reviewed. By analyzing the categories to which user rated services belong, the system may be able to identify alternative services 110 that may be similar or otherwise of interest for consideration.

Still further, the system knowledge 114 may be utilized, e.g., queried, compiled, aggregated, assembled or otherwise evaluated by users, such as that may be interacting within the community via a user client 140. Thus, a user may be able, for example, to select desired services 110 when executing a composition application (if applicable), to evaluate composition applications 108 and services 110 and perform other suitable activities.

Thus, the system knowledge 114 may be derived from a community of users, which may comprise system processes, such as the monitoring component(s) 144, as well as human operators/users that contribute annotations via a suitable user client 140 to interface with the system knowledge. Moreover, the system knowledge 114 may continue to grow over time, and may further be shared, distributed and otherwise propagated, which further continues to grow the available knowledge.

According to an aspect of the present invention, a folksonomy may be utilized to allow users, including persons and electronic users such as services, components and other automated processes, to collaboratively organize information into different groupings. Thus, the folksonomy may be used as a system of classification for content related to composition applications and/or services that is at least partially reflective of the way in which an associated community of users chooses to describe and classify the content.

As an example, the optimizing component 146 may read annotations, such as keywords, tags, labels, descriptions, etc., that are provided by user input, and which are stored in the system knowledge 114, e.g., as a folksonomy, and infer usage and/or perform classification tasks using various proprietary or non-proprietary classification schemes. Moreover, the system-derived usage information can be used to identify relationships between services 110. Thus, the system may be able to make recommendations based upon inference, statistical likelihoods, actual metrics and other factors. By analyzing the categories to which user-rated services belong, the system can identify alternative services that may be similar or otherwise of interest for consideration.

When the flow is created, information about the relationships between the selected services and information about a specific user are stored in the system knowledge 114. This information may then be evaluated the next time a user wants to work with one or more of the previously selected services.

Figure 4:
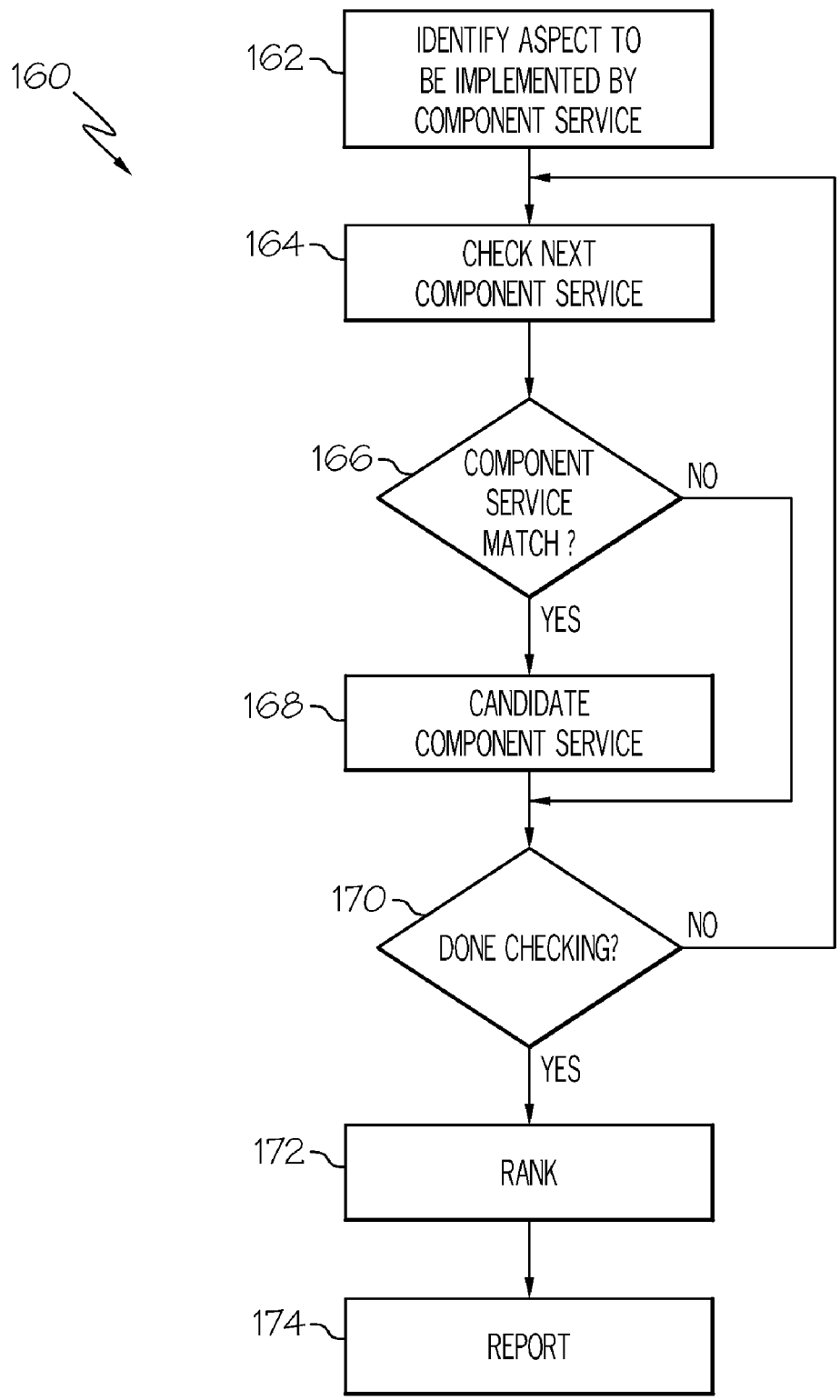
FIG. 4 is a flowchart for ranking candidate services.

Referring to FIG. 4, a method 160 of selecting services for implementing a process is illustrated. A user, which may be a person or electronic user, decides to implement a process and a representation of the process flow may be composed using a series of services. As noted in greater detail herein, there may be more than one service available that can implement each designed-for aspect of the process. Accordingly, an aspect (subpart) of the process is identified at 162. The system checks a service at 164 to identify whether the available service is capable of implementing the corresponding aspect of the process.

If a subpart of a corresponding process can be implemented by assembling two or more services, then the subpart may be further broken down at 162, or the check at 164 may be configured to consider not only single services, but also collections of services that correspond to the associated subpart.

If a match is determined at 166, the selected service can perform the associated aspect of the process. As such, the selected service is identified as a candidate service at 168 and flow continues to 170. If a match is not determined, the process skips to 170. A decision is made at 170 as to whether all of the services desired to be considered have been checked to see if they can perform the corresponding aspect of the process. If there are more services that are desired to be considered, then flow loops back to check the next service at 164. If all of the services that the system desires to consider have been checked, the candidate (matching) services are ranked at 172 and are reported to the user at 174.

The user may then make an appropriate services selection based, at least in part, upon the report. For example, to establish the rank of services, a system may utilize the weights 138 and/or other policies/rules, etc., to build an ordered list of candidate (matching) services at 172 that can be displayed or otherwise conveyed to the user at 174. In one illustrative example, the system can provide a list of possible matches based on its current knowledge, e.g., the system knowledge 114 of the relationships between services 110, which may include, for example, performance metrics, statistics, cost, etc.

Accordingly, the system knowledge can be utilized for selecting the best service(s) out of a set of services that provide the same functionality, e.g., based upon user provided criteria information. Moreover, the system can learn about compositions that implement processes and the corresponding services from the community usage feedback. Thus, the system according to various aspects of the present invention, can choose the best services that should be put into a services composition. Further, the system can choose the best services to replace a subset in a composition based upon the knowledge the system has learned from the corresponding community of users. Additionally, community added data about services may be provided to a user.

As a further example, the ranking performed at 172 may be supplemented by, altered or otherwise reconfigured based upon usage data, including usage histories and any other provided annotations to select the services that are suited to the designed-for business process. Policy-based mechanisms, user preferences and/or rankings and other user information from the system knowledge may also be used for creating and/or modifying the list of recommendations based upon the ranked services. As yet another illustrative example, the ranking performed at 172 may consider usage history in establishing the ranked order of matching services by including and/or otherwise considering factors such as the specific user, user group and/or a usage timeline. Thus, a user can make an informed services selection without performing a lot of detailed searching of available services 110.

The system knowledge is dynamic, as noted in greater detail herein. As such, the suitability of services as ranked in a first search/ranking may be quite different from the services listed in a second search/ranking. Differences in ranking may result for example, of system knowledge gained in an intermediate duration between the first search/ranking and the second search/ranking and/or in differences in the preferences of users interacting with the system. In this regard, the ranking set out at 172 may be based, for example, on policy-based mechanism so that recommended solutions map closely to the requirements specified, e.g., by the user in defining the corresponding process. Thus, users may be able to determine which metrics and/or other factors are important and create a policy to enforce their preferences.

Figure 5:
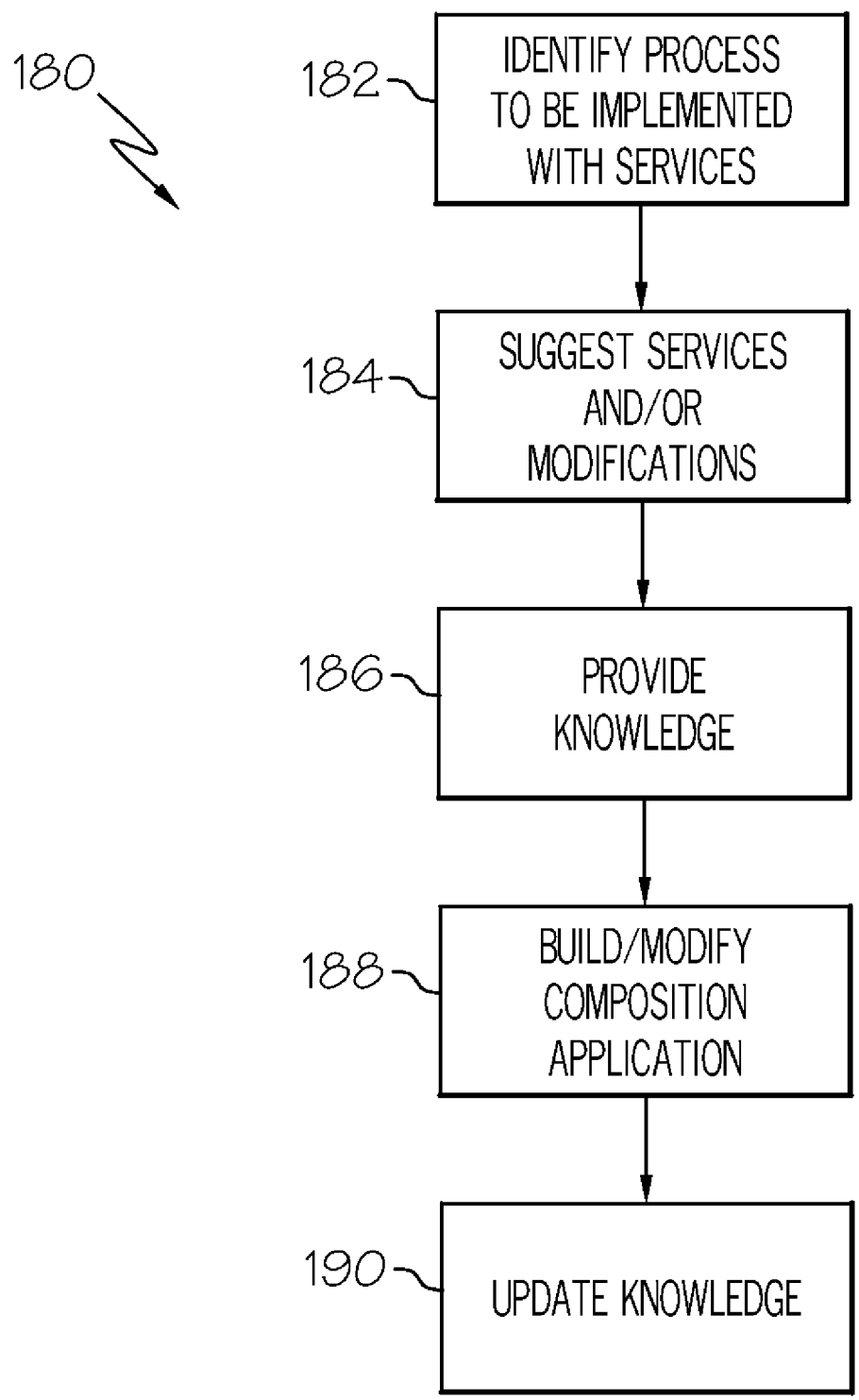
FIG. 5 is a flow chart for building and/or modifying composition applications and/or services of composition applications.

Referring to FIG. 5, an exemplary approach 180 to making composition application and/or services recommendations is illustrated. The approach 180 may be utilized, for example, when a user (human or automated process) creates, updates or otherwise modifies a composition application. Initially, processes are identified that are to be implemented with services at 182. A process at 184, such as may be implemented by the composition design component 150 or other component shown in FIG. 3 may be used to suggest or recommend services or suggest changes/modifications to services or the relationships of services. Thus, while the user is selecting the necessary services to implement the process, the system, e.g., via the composition design component 150, can suggest modifications to the user's selections and/or process based on the system's knowledge, including the knowledge collected in the folksonomy. Still further, mechanisms can be used to recommend replacements, modifications and other adjustments to the corresponding composition applications using techniques other than ranked lists. Furthermore, replacements, modifications and other adjustments may be automatically implemented based, for example, upon corresponding provided policy-based mechanisms.

Still further, the history of usage and user input can be made available to the user at the time of services selection, e.g., when building or modifying processes, so that users can choose the best services options for their needs. Moreover, a user can then add information about the services that they use, e.g., by contributing to the folksonomy.

As an example, the system can use the weights assigned at 138 and/or other criteria to display an ordered list of services that match or are otherwise capable of implementing the associated aspects of the process. The user can examine the list in detail, including the usage history of the services. The usage history can include the specific user, the user group, and usage timeline. This allows the user to make an informed decision based upon community driven feedback of services. For example, rankings such as ranked lists as described with reference to FIG. 4 may be constructed. Under this arrangement, the available system knowledge 114, policies, rules, thresholds and other data may be consulted from the data area 148 and other relevant information may be consulted.

In the above arrangement, the use of models is not precluded. Rather, the reliance on the system knowledge, including a folksonomy to propose services that would fit a required composition can enable services to be classified across different models.

In addition to making recommendations, suggesting services and modifications, the process may provide knowledge to the user at 186. For example, if the user is a human user, reports, graphs, charts and other visual metaphors, text based information including the annotations added to the system knowledge may be made available to the user for inspection. For example, usage histories may be examined based upon any logical grouping, such as by specific user, user groups, usage timelines, etc. User added metadata may also be made available for inspection by the user. Further, the user may be able to query the system knowledge or otherwise locate and retrieve relevant information such that community gathered knowledge is available for consideration.

Services and their relationships with other services change over time. Thus, the intended use of a given service may not be how that web service is used in practice. For example, it may be the case that new uses are discovered for an existing web service. Alternatively, a designed-for use of a web service may become obsolete by changes implemented by a corresponding organization. However, such changes will likely be characterized in the metadata associated with the corresponding folksonomy.

The composition application is built, modified, edited or otherwise revised at 188. In this regard, replacements or modifications may be implemented by changing one service for an alternative service or services. That is, a given service may be replaced another service. A service may be replaced by multiple services. Alternatively, multiple services may be replaced by a single service. Still further, the composition application may be conceptually divided into one or more subparts, where each subpart comprises one or more services etc. Under this arrangement, a subpart of a composition application may be modified by replacing or otherwise modifying the corresponding service(s) of their associated subpart, the relationships between the services, etc. Other modifications may also be implemented, e.g., so as to adjust the relationships between services and/or composition applications.

The use of a folksonomy as part of the system knowledge 114, allows the selection of services that reflect current usage patterns of an associated community of users. Thus, the system knowledge 114 represents the collective knowledge of how services are used in implementing business processes. Accordingly, service replacements and modifications may be more accurately implemented so as to reflect current usage patterns. Moreover, leaning may be collective, such as based upon what user input, what users are currently selecting, what users have selected in the past and/or what the user opinions are with regard to available services. Human error in selecting non-optimal services and the time required to create and modify business processes may thus be reduced.

The components in the computing environment may learn about the usage of services over time and adjust the relationships between services of corresponding composition applications based upon the learned knowledge. In addition, the strength of the relationships between certain services can be enhanced by input from the community. Such enhancements can be used to replace or modify components in the business process that characterizes the associated composition application with better defined relationships. Thus, the system represents the collective knowledge of how services are used in business processes. Collective learning based upon what users are currently selecting and what users have selected in the past is thus achievable. Moreover, the user may opt to select one or more of the automatically suggested services, or the user can opt to use their own selected services or combinations of services. Still further, the user may create their own composition using only their own selected services, a combination of process recommended services in addition to user selected services, or the user may opt to utilize only automatically recommended services.

After the composition application has been built or modified, the system knowledge is updated at 190, e.g., to add metadata to reflect the choices made by the user, to record annotations and comments added by the user with regard to either the selected services 110, or to the services that were not selected. As such, the system knowledge can grow with regard to services 110 that are not being used. Further, the system knowledge may be updated with information regarding relationships between the selected services and information about the specific user. Thus, a subsequent user may be able to see what combinations were selected by previous users, and optionally, the reasons therefore, which may further weight or otherwise influence the selection of services. For example, a first services match may be selected by a first user due to criteria unique to the first user that would make that same combination of services less than ideal for a second user, which may have different criteria, conditions, considerations, etc. Thus, when a subsequent user builds or modifies a process or otherwise searches the system knowledge, the user may be presented with the latest information about the associated services.

Figure 6:
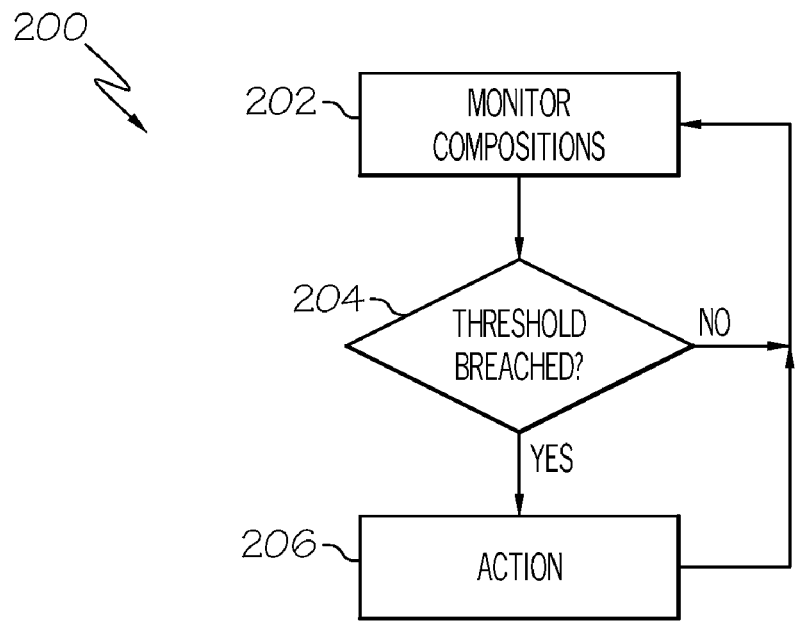
FIG. 6 is a flow chart for monitoring compositions for threshold breaches.

Referring to FIG. 6, over time, as the system knowledge grows, the system will have learned about, or will be able to discover, relationships between different services. Thus, the system may determine that previously created compositions are not optimal, or are no longer optimal. Accordingly, a process 200 may be implemented to keep composition applications and/or services up-to-date. Such may be implemented, for example, by the optimizing component 146 shown in FIG. 3.

One or more composition applications are monitored at 202. The monitoring operation at 202 can be an ongoing operation, a periodic or otherwise triggered operation. For example, the monitoring component 140 may continually or periodically (at any fixed or variable intervals), perform a scan of the associated composition application(s). As yet another example, a scan may be performed based upon predetermined events, such as after detecting that a user has made changes to a composition application and/or service.

In an illustrative example, each composition application may be assigned a threshold of accepted deviation between current and system-determined optimal composition operation. A check is made at 204 as to whether the threshold has been breached. If the threshold has been breached, then a predetermined action is taken at 206. Otherwise, the system continues the scan. The threshold may be based upon any number of factors, such as weight, time and cost. Further, the threshold factors may be specified by a user. Still further, thresholds may be defined for an entire composition application or a subpart thereof, where each subpart of a composition application may comprise one or more services.

The action(s) taken at 206 will likely depend upon the particular implementation of the system. For example, an action may comprise making a recommendation that a composition application and/or services of a corresponding composition application be replaced or modified. In this regard, a ranked list of candidate replacements may be provided to a user so that a decision can be made based upon accumulated community knowledge as to whether the user chooses to update the composition application. As another example, in an autonomous processing environment, the action may comprise automated replacement of the composition application and/or services that triggered the breach. Under this arrangement, a component such as the optimizing component 146 may automatically implement the replacements to the associated composition application.

The system may automatically modify the relationship between services over time based upon the systems knowledge of usage history and user input. The system may learn about which services users select and how such services are used to interact with other services. Users may add information about services that they use. The rules, policies and/or other factors may indicate when a composition application should be modified. In addition, the community's usage and feedback can affect the suggestions and feedback the system and other disclosure provides to the user. Thus, service replacement may be affected by feedback from the community relating to the service being replaced, or to other candidate services. For example, a service may be able to perform its intended purpose within the business process. However, another candidate service may be better suited, more optimal, preferred or otherwise desired by the corresponding community of users.

Figure 7:
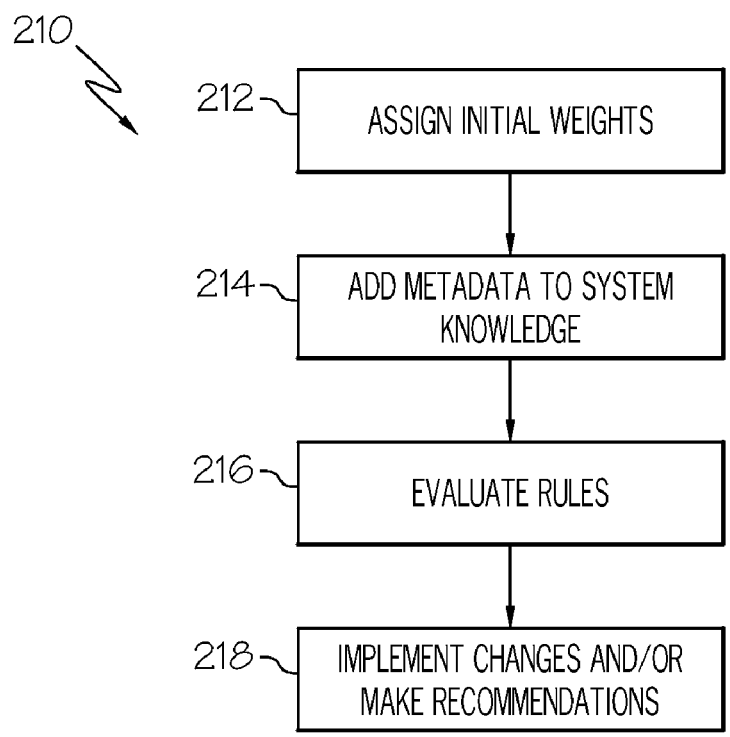
FIG. 7 is a flow chart for implementing changes and/or making recommendations for changes of composition applications.

Referring to FIG. 7, a process 210 illustrates an exemplary implementation to keep composition applications and/or services up-to-date. Initial weights are assigned at 212. The initial weights may, for example, characterize the relationships between services and/or composition applications. The initial weights may comprise weights assigned at 138, described with reference to FIG. 3. Also, system knowledge is created for accumulating information regarding the composition applications and services used by and/or available to a community of users, such as using techniques described more fully herein. Over time, information comprising a combination of usage history and user input is added to system knowledge at 214. For example, information may be contributed to a folksonomy and/or other information may be collected, such as metrics, statistics, system information detected while monitoring system activities, etc.

Thus, the weights can be modified over time, by a user and/or automatically. For example, the weights may be reflective of how well services work together. Weights may also be reflective of current usage patterns. As services may change over time, so to, can the weights.

A component may be utilized at 216 to evaluate rules, policies, monitor thresholds, or otherwise monitor the composition applications and/or services, either directly or indirectly. Based upon the evaluations performed at 216, actions are performed at 218, such as by automatically modifying or replacing services, modifying the relationships between services, modifying composition applications and/or making recommendations, suggestions or otherwise providing information to a user so that adjustments may be implemented. Such actions may be implemented, for example, by the optimizing component 146 shown in FIG. 3. Thus, modifications may be automatically implemented, such as by a component executing within the computer processing environment, or modifications can be implemented by a user based upon information provided to the user based upon an evaluation of the information available in the folksonomy.

As an example, the evaluations performed at 216 may comprise analyzing usage history and user input, such as by examining the information collected in the folksonomy. The implementations at 218 may thus comprise enhancing the relationships between services, such as by making modifications, replacements or other adjustments to the corresponding composition application. Moreover, modifications implemented at 218 may be further enhanced by updating the metadata in the folksonomy with information characterizing the modifications that were made.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a module, component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for monitoring composition applications and services within a community of users comprising:
   a data collection component executed on at least one server computer that stores system knowledge in at least one computer storage device, said system knowledge comprising usage history information and user input information with regard to computer systems including composition applications and services within a community of users, wherein each composition application is assembled using at least one of the services to implement a corresponding business process when executed, and said system knowledge comprising at least a folksonomy;

at least one user client that interacts with said data collection component to provide user input information that is stored within said folksonomy by said data collection component to enable corresponding users to contribute user-derived information to said folksonomy;

at least one monitoring component that monitors computer-implemented activities associated with said community of users and interacts with said data collection component to contribute usage history information that is stored by said data collection component as system knowledge; and an optimizing component that learns about the use of at least one composition application within said community of users over time, and learns about at least some of the services within the community of users over time, wherein the optimizing component further modifies at least one of a selected composition application and a relationship relationships between composition between the selected composition application and at least one associated service utilized by that selected composition application within said community of users by automatically triggering changes to that selected composition application based, at least in part, on information obtained from said system knowledge including said folksonomy.

2. The system according to claim 1, wherein said optimizing component initiates an evaluation of a select composition application within said community of users by detecting a triggering condition based upon an evaluation of said select composition application against an associated threshold value.

3. The system according to claim 1, wherein said optimizing component triggers changes by performing an adjustment comprising at least one of automatic replacement, automatic modification, a recommendation of replacement and a recommendation of modification corresponding to at least one service of said select composition application based upon information from said system knowledge.

4. The system according to claim 3, wherein said adjustment follows a policy based mechanism.

5. The system according to claim 1, further comprising an administration component configured to enable a user to assign weights to services available to said community of users, wherein said weights are utilized by said optimizing component to enhance said relationships between said services within said community of users by performing adjustments to composition applications.

6. The system according to claim 5, wherein said monitoring component is utilized to periodically adjust said weights to reflect current relationships between said services.

7. The system according to claim 1, wherein said optimizing component triggers changes to composition applications by performing an adjustment so as to reflect current usage patterns of services within said community of users.

8. A method for monitoring composition applications and services within a community of users comprising:

executing a data collection component on at least one server computer that stores system knowledge in at least one computer storage device, said system knowledge comprising usage history and user input information with regard to computer systems including composition applications and services within a community of users, wherein each composition application is assembled using at least one of the services to implement a corresponding business process when executed, and said system knowledge comprising at least a folksonomy;

receiving user input information from at least one user client that is stored within said folksonomy by said data collection component to enable a corresponding user to contribute user-derived information to said folksonomy; and receiving monitoring information from at least one monitoring component that monitors computer-implemented activities associated with said community of users that is stored by said data collection component to contribute usage information to said system knowledge; and executing an optimizing component that learns about the use of at least one composition application within said community of users over time, and learns about at least some of the services within the community of users over time, wherein the optimizing component further modifies at least one of a selected composition application and a relationship between the selected composition application and at least one associated service utilized by that selected composition application within said community of users by automatically triggering changes to that selected composition application based, at least in part, on information obtained from said system knowledge including said folksonomy.

9. The method according to claim 8, wherein said providing an optimizing component configured to learn about the use of services over time comprises:

initiating an evaluation of a select composition application within said community of users by detecting a triggering condition based upon an evaluation of said select composition application against an associated threshold value.

10. The method according to claim 8, wherein said automatically triggering changes within said system based, at least in part, on information obtained from said system knowledge including said folksonomy further comprises:

performing an adjustment comprising at least one of automatic replacement, automatic modification, a recommendation of replacement and a recommendation of modification corresponding to at least one service of said select composition application based upon information from said system knowledge.

11. The method according to claim 10, wherein said performing said adjustment further comprises:

following a policy based mechanism.

12. The method according to claim 8, further comprising providing an administration component configured to enable a user to assign weights to services available to said community of users, wherein said weights are utilized by said optimizing component to enhance said relationships between said services within said community of users by performing adjustments to composition applications.

13. The method according to claim 12, wherein said providing a monitoring component that monitors activities associated with said community of users and interacts with said data collection component to contribute usage information to said system knowledge further comprises:

adjusting periodically, said weights to reflect current relationships between said services.

14. The method according to claim 8, wherein said providing an optimizing component configured to learn about the use of services over time further comprises:

performing an adjustment to composition applications so as to reflect current usage patterns of services within said community of users.

15. A computer program product for monitoring composition applications and services within a community of users comprising:

a computer usable storage medium having computer usable program code embodied therewith, the computer usable program code comprising:

computer usable program code configured to implement a data collection component executed on at least one server computer that stores system knowledge in at least one computer storage device, said system knowledge comprising usage history information and user input information with regard to computer systems including composition applications and services within community of users, wherein each composition application is assembled using at least one of the services to implement a corresponding business process when executed, and said system knowledge comprising at least a folksonomy;

computer usable program code configured to receive user input information from at least one user client that is stored within said folksonomy by said data collection component to enable a corresponding user to contribute user-derived information to said folksonomy;

computer usable program code configured to receive monitoring information from at least one monitoring component that monitors computer-implemented activities associated with said community of users that is stored by said data collection component to contribute usage history information to said system knowledge; and computer usable program code configured to implement an optimizing component that learns about the use of at least one composition application within said community of users over time, and learns about at least some of the services within the community of users over time, wherein the optimizing component further modifies at least one of a selected composition application and a relationship between the selected composition application and at least one associated service utilized by that composition application within said community of users by automatically triggering changes to that selected composition application based, at least in part, on information obtained from said system knowledge including said folksonomy.

16. The computer program product according to claim 15, wherein said computer usable program code configured to implement an optimizing component initiates an evaluation of a select composition application within said community of users by detecting a triggering condition based upon an evaluation of said select composition application against an associated threshold value.

17. The computer program product according to claim 15, wherein said computer usable program code configured to implement an optimizing component triggers changes by performing an adjustment comprising at least one of automatic replacement, automatic modification, a recommendation of replacement and a recommendation of modification corresponding to at least one service of said select composition application based upon information from said system knowledge.

18. The computer program product according to claim 17, wherein said adjustment follows a policy based mechanism.

19. The computer program product according to claim 15, further comprising computer usable program code configured to implement an administration component configured to enable a user to assign weights to services available to said community of users, wherein said weights are utilized by said optimizing component to enhance said relationships between said services within said community of users by performing adjustments to composition applications.

20. The computer program product according to claim 19, wherein said computer usable program code configured to implement a monitoring component is utilized to periodically adjust said weights to reflect current relationships between said services.

21. The computer program product according to claim 15, wherein said computer usable program code configured to implement an optimizing component triggers changes by performing an adjustment to composition applications so as to reflect current usage patterns of services within said community of users.

* * * * *